Sept. 29, 1964 M. SYMONS 3,151,238

DEVICES FOR DIVIDING BINARY NUMBER SIGNALS

Filed Nov. 4, 1960 2 Sheets-Sheet 1

Sept. 29, 1964 M. SYMONS 3,151,238

DEVICES FOR DIVIDING BINARY NUMBER SIGNALS

Filed Nov. 4, 1960 2 Sheets-Sheet 2

United States Patent Office 3,151,238
Patented Sept. 29, 1964

3,151,238
DEVICES FOR DIVIDING BINARY NUMBER SIGNALS

Michael Symons, Harrow, England, assignor to Electric & Musical Industries Limited, Hayes, England, a company of Great Britain Filed Nov. 4, 1960, Ser. No. 67,307
Claims priority, application Great Britain Nov. 7, 1959
6 Claims. (Cl. 235—155)

The present invention relates to an improved arrangement for dividing numbers expressed in digital form, for example binary form and is especially suitable for performing the divisions necessary for binary to decimal or binary to sterling conversion.

The object of the present invention is to provide a simple arrangement for the division at high speed of numbers expressed in binary form.

According to the present invention a circuit arrangement for dividing a dividend by a predetermined number comprises means for receiving signal elements representing digits of the dividend in order digit by digit and means responsive to the signal elements for controlling the passage of a marker signal at a series of points at which the marker signal may take one or other of at least two paths, the arrangement of the paths being such that the quotient can be determined by the paths through which the marker signal has been passed and the remainder can be determined by the path to which the marker signal is passed in response to the last of said signal elements.

The reference herein and in the claims to "receiving signal elements in order" is to be taken to mean either in time order or in position order.

Figure 1:
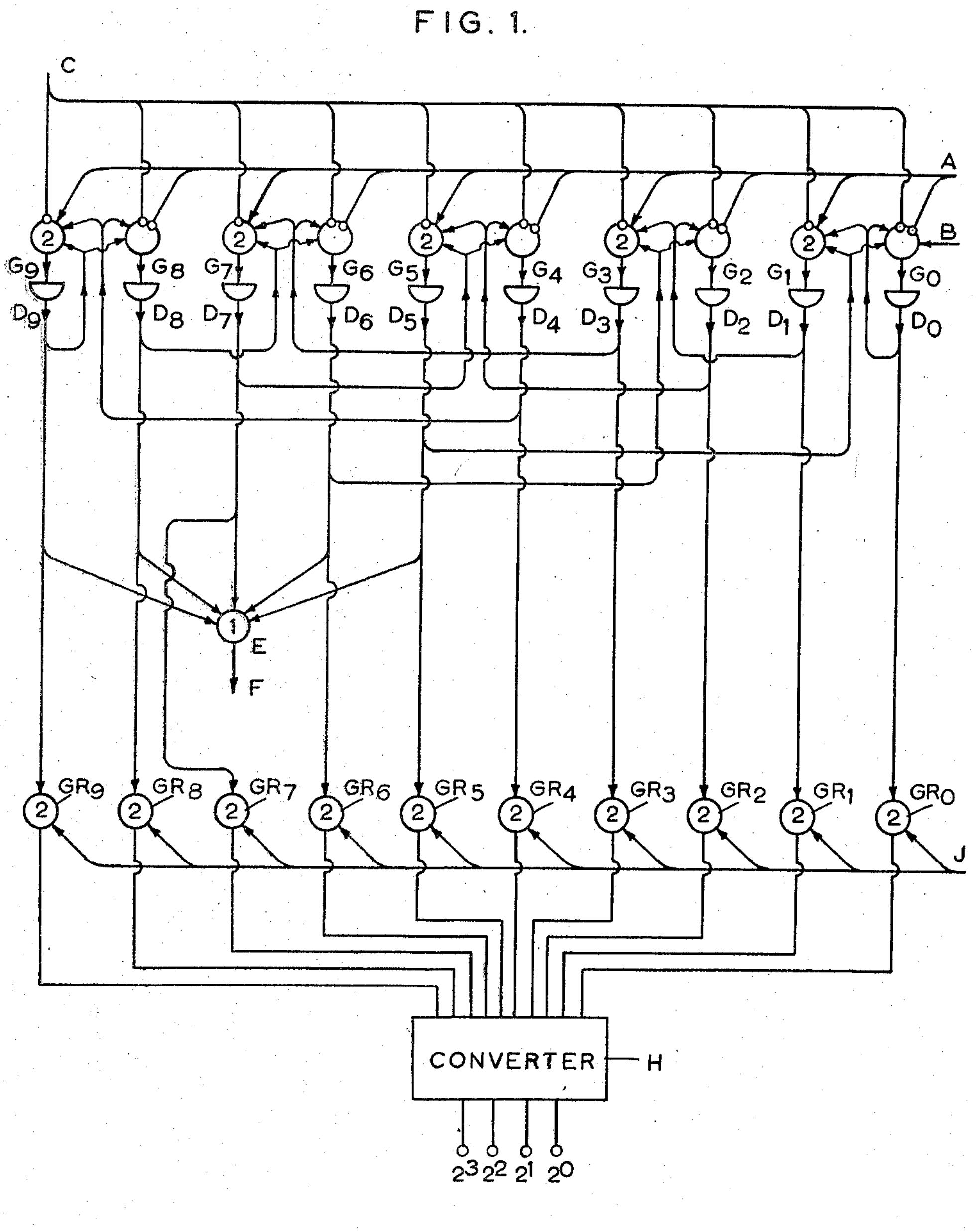
Figure 2:
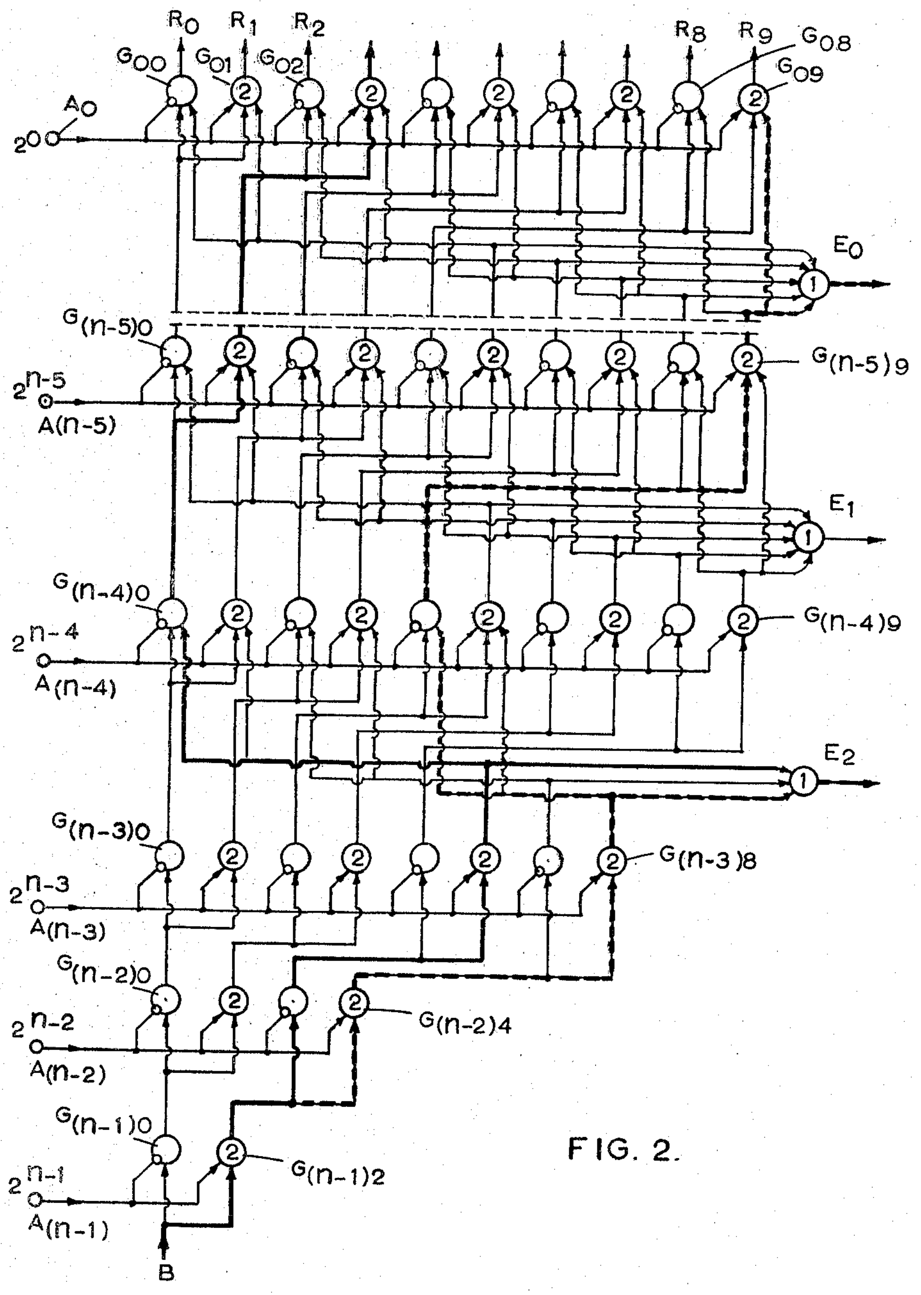

In order that the invention may be fully understood and readily carried into effect, it will now be described with reference to the accompanying drawing in which:

FIGURE 1 illustrates, in diagrammatic form one example of a circuit arrangement according to the present invention, adapted to operate in the serial mode binary coded number by ten, and FIGURE 2 illustrates a modification of FIGURE 1 adapted for operation in the parallel mode.

Referring to the drawing, the number to be divided by ten enters at A in serial binary coded form with the digit of greatest significance first. From the point A, the number is applied to the control connections of the ten gates $G_0$, $G_1$, $G_2$, $G_3$, $G_4$, $G_5$, $G_6$, $G_7$, $G_8$, and $G_9$. The connections to the gates are shown in conventional form, that is, enabling connections or information input connections are represented by arrowheads, disabling or inhibiting connections by small circles, and the threshold of the gate is given by the number within the large circle representing the gate or is one if there is no number.

The gates $G_0$, $G_2$, $G_4$, $G_6$ and $G_8$ are of threshold 1 and have inhibit connections connected to the point A. The gates $G_1$, $G_3$, $G_5$, $G_7$ and $G_9$ are normally closed and have enabling connections connected to the point A.

The output connections of the gates $G_0$ to $G_9$, inclusive are connected to the input conections of delay elements $D_0$ to $D_9$, inclusive, respectively. The delay elements may incorporate pulse amplifiers if required. The delay of each of the elements $D_0$ to $D_9$, inclusive, is equal to one digit period of the serial binary number entering at A, unless some delay is incurred in the gates $G_0$ to $G_9$ in which case the delay of the elements will be correspondingly reduced.

The output of delay element $D_0$ is connected to input connections of gates $G_0$ and $G_1$. The output of delay element $D_1$ is connected to input connections of gates $G_2$ and $G_3$. The output of delay element $D_2$ is connected to input connections of gates $G_4$ and $G_5$. The output of delay element $D_3$ is connected to input connections of gates $G_6$ and $G_7$. The output of delay element $D_4$ is connected to input connections of gates $G_8$ and $G_9$, the output of delay element $D_5$ is connected to input connections of gates $G_0$ and $G_1$. The output of delay element $D_6$ is connected to input connections of gates $G_2$ and $G_3$. The output of delay element $D_7$ is connected to input connections of gates $G_4$ and $G_5$. The output of delay element $D_8$ is connected to input connections of gates $G_6$ and $G_7$. The output of delay element $D_9$ is connected to input connections of gates $G_8$ and $G_9$.

The outputs of delay elements $D_5$, $D_6$, $D_7$, $D_8$ and $D_9$ are also connected to input connections of a threshold 1 gate E. From the output of the gate E at point F is obtained the quotient also in serial binary form.

An initiating pulse which constitutes a marker signal is applied at B to an input connection of gate $G_0$. A clearing pulse is applied at C at the end of one division so as to prepare the apparatus for a further division. The point C is connected to an inhibiting or disabling connection on each of the gates $G_0$ to $G_9$ inclusive. In operation before any information pulses are applied, an initiating pulse is applied at B, which recirculates in the loop including $G_0$ and $D_0$ until the first information pulse is applied.

When a serial binary coded number appears at A, which it does in the form of a sequence of pulses and spaces, a pulse represents a "1" and a space a "0." As is usual in the case of a serial number the time in the cycle at which the 1's and 0's appear determines their significance, the cycle being divided into a number of digit periods.

When the first pulse representing a "1" appears at A, it does so simultaneously with the output of the delay element $D_0$ of the recirculating initiating pulse which is the marker signal, the timing of the initiating pulse being determined to ensure this. The pulse at A closes the gate $G_0$ and opens the gate $G_1$, so that the pulse no longer recirculates but passes through the gate $G_1$, and the delay element $D_1$, so that it appears at the output of $D_1$ simultaneously with the next input digit of the number being applied at A. If this second input digit is a "0" the gate $G_2$ will be open and the pulse will pass into delay element $D_2$. If, however, the second input digit is a "1," the gate $G_3$ will be open and the gate $G_2$ closed, so that the pulse will pass into the delay element $D_3$.

Thus it can be seen that a pulse leaving delay element $D_r$ is applied to both $G_{2r}$ and $G_{2r+1}$ and depending on whether the next input digit is "0" or "1," is passed to $D_{2r}$ or $D_{2r+1}$, for $r=0$, 1, 2, 3 or 4.

For $r=5$, 6, 7, 8 or 9 the output of $D_r$ is fed to an input connection of the threshold 1 gate E, and is the input connections of gates $G_{2r-10}$ and $G_{2r-9}$, the gate $G_{2r-10}$ being open and gate $G_{2r-9}$ closed if the next input digit is a "0" and the gate $G_{2r-9}$ being open and gate $G_{2r-10}$ closed if the next input digit is a "1."

In this manner, if at any instant we regard the information pulses so far applied at A as representing a binary number in which the most recent digit be it "1" or "0" is of order $2^0$, the next most recent is of order $2^1$ and so on, the suffix "$r$" of the delay element $D_r$ or the gate $G_r$ through which the marker signal pulse is passing, is the remainder which would be obtained if that number were divided by ten. Up to this time, the pulses leaving the output connection of the gate E at F in response to the passages of the marker signal pulse form a serial binary code number representing the quotient of the above division, the order of the digits being taken as the same as that of the corresponding digits in the number from which the quotient is derived. Therefore, at the end of a division, just after the space or pulse representing the digit of least significance of the incoming binary coded number has been presented at A, the suffix $r$ of the gate $G_r$ or delay element $D_r$ through which the pulse is passing is the remainder, and the quotient is given by the serial binary coded number having been delivered at F, the significance of which is determined with reference to the timing of the input binary coded number.

Taken for example, the division of binary numper 1101001110 which is, of course 846. The operation of the circuit may be followed from the table below:

| Digit No. | Input digit | Delay element $D_r$ from which pulse is derived | Gate $G_r$ through which pulse is fed | Output digit |
|---|---|---|---|---|
| 1 | 1 | $D_0$ | $G_1$ | 0 |
| 2 | 1 | $D_1$ | $G_3$ | 0 |
| 3 | 0 | $D_3$ | $G_6$ | 0 |
| 4 | 1 | $D_6$ | $G_3$ | 1 |
| 5 | 0 | $D_3$ | $G_6$ | 0 |
| 6 | 0 | $D_6$ | $G_2$ | 1 |
| 7 | 1 | $D_2$ | $G_5$ | 0 |
| 8 | 1 | $D_5$ | $G_1$ | 1 |
| 9 | 1 | $D_1$ | $G_3$ | 0 |
| 10 | 0 | $D_3$ | $G_6$ | 0 |

The output number is 0001010100, which is 84. The gate through which the pulse is passing just after the pulse representing the digit of least significance of the incoming binary number has been applied at A is $G_6$, and therefore the remainder is 6.

To obtain the remainder in binary code in addition to the quotient, nine remainder gates $GR_0$ to $GR_9$ are provided, one connected to the output connection of each of the delay elements $D_0$ to $D_9$ inclusive. The output connections of these remainder gates are attached to an encoder H for converting one out of ten into a binary code combination. The remainder gates are all opened simultaneously just after the last digit period of the incoming binary coded number, by a suitable timing pulse applied via the lead J. The output of the encoder H is in parallel form but can be serialised in known manner if desired. In the present example an encoder is employed which is a diode encoder of the form shown in FIGURES 2–13 of "Digital Computer Components and Circuits," by R. K. Richards, published by Van Nostrand, and therefore illustrated merely by means of the rectangle H. Other forms of encoder may however be used.

When the division is completed a clearing pulse is applied at C closing the gates $G_0$ to $G_9$ so that the marker signal is suppressed and cannot upset subsequent divisions or cause spurious output pulses.

The same apparatus may be used for division by five except that the input connections to the gate E would be connected to the output connections of gates $G_5$, $G_6$, $G_7$, $G_8$ and $G_9$ instead of to the output connections of the delay elements $D_5$, $D_6$, $D_7$, $D_8$ and $D_9$. This would have the effect of multiplying the quotient by 2 compared with the case of division by ten, but it is important that the gates $G_5$ to $G_9$ inclusive should not delay the pulse appreciably, otherwise the significance of the binary digits may be confused. Moreover only five remainder gates are required connected to the outputs of $D_0$ to $D_4$ respectively.

In general, for the device to divide by $2^p \times R$ where R is an odd number and $p$ is any integer, 2R gates G are needed together with the associated delay elements D. Since division by 2 is achieved by delaying the number to be divided by one digit period, division by $2^p$ is achieved by delaying the output number relative to the input periods as by the delay elements $D_5$ to $D_9$ in the illustrated example. In the illustrated example R is five and $p$ is one However, the divider may include delays which amount to a further division by a power of two and the extra delays provided should take account of the intrinsic delays of the divider. Thus in general the 2R gates G and the associated delay elements D are arranged in a circuit similar to that shown in the drawing so that the outputs of delay elements $D_r$ and $D_{r+R}$ are connected to the input connections of gates $G_{2r}$ and $G_{2r+1}$ for $$0 \leqslant r \leqslant R-1$$

and the outputs of the delay gates $G_R$ are connected to the inputs of gate E, through delay elements giving a delay of $p$ digit periods. As before, the even numbered gates $G_{2r}$ are closed and the odd numbered gates $G_{2r+1}$ are opened by an input pulse at A.

Division by a number which can be expressed by $2^p+R^q$ where $q$ is an integer is achieved by continued division $q$ times, the first quotient being the number for the second division, and so on. In this case the successive remainders are accumulated, the previous remainder being multiplied by 10 before each accumulation.

If the input information is not in binary code form that is coded with respect to another radix say N, then for division by a number R, not divisable by N there will be required $N.R$ gates G and delay elements D. Moreover it can be shown that in this case the correct result is obtained when the outputs from delay elements $D_r, D_{r+R}, D_{r+2R}, \ldots, D_{r+(N-1)R}$, are connected to the inputs all of the gates $G_{Nr}, G_{Nr+1}, \ldots$, and $G_{Nr+(N-1)}$ for $0 \leqslant r \leqslant (R-1)$. If the input digit is a 0 then the gates $G_0, G_N, G_{2N}, \ldots$, and $G_{(R-1)N}$ are opened. If the input digit is $n$ ($<$N) then gates $G_n, G_{N+n}, G_{2N+n}, \ldots$, and $G_{(R-1)N+n}$ are opened, and so on. The output digit 0 is derived from the outputs of delay elements $D_0, D_1, D_2, \ldots$, and $D_{R-1}$, the output digit $n$ ($\leqq$N) is derived from the outputs of delay elements $D_{Rn}, D_{Rn+1}, D_{Rn+2}, \ldots$, and $D_{Rn+R-1}$ and so on for each of the N output digits.

The gates G and the delay elements D may conveniently comprises magnetic storage cores coupled to transistors as described in co-pending United States patent application Serial Number 731,735.

Whilst the invention has been described with reference to a specific embodiment together with certain modifications, any of the variants of digital computer practice well known to those skilled in the art, may be incorporated into devices using the present invention. In particular, parallel operation may be achieved using a number of groups of gates, connected so that the outputs from the gates $Gm$ of one group instead of being delayed and fed to other gates G of the same group, are fed directly to the corresponding gates of the next group to which the digit of next lower significance is fed. This is illustrated in FIGURE 2 in which references $A_0 \ldots A_{(n-1)}$ represent input terminals for a binary coded number presented in parallel mode, the $2^0$ digit being applied to terminal $A_0$, and so on. The terminals from $A_1$ to $A_{(n-5)}$ are not shown in the drawing since all connections associated with these terminals are identical with those associated with terminals $A_0$ and $A_{(n-5)}$. The terminal $A_0$ is connected to ten gates $G_{00}, G_{01}, G_{02} \ldots G_{09}$ which correspond to the gates $G_0$ to $G_9$ of FIGURE 1. Similarly the terminal $A_{(n-5}$ and $A_{(n-4)}$ is connected to ten gates $G_{(n-5)0}$ to $G_{(n-5)9}$ and $G_{(n-4)0}$ to $G_{(n-4)9}$ respectively. However the terminals for the three signals of highest order are connected only to eight, four and two gates respectively which are referenced according to the scheme adapted for the other gates. The quotient is represented by those of the gates $E_0$ to $E_2$ which provide output pulses in response to the passage of the marker signal through the various gates G, the marker signal being constituted by an initiating pulse applied at terminal B in synchronism with the pulses representing the binary coded dividend when applied to the terminals $A_0$ to $A_{(n-1)}$. The gates $G_{00}$ to $G_{09}$ have output leads $R_0$ to $R_9$ and the remainder is represented as in FIGURE 1 by the serial order of the output lead on which a pulse appears.

In order to demonstrate the operation of FIGURE 2, assume that $n=6$ and that input pulses representing the binary number 101011 (namely 43 in decimal scale) are applied to the terminals $A_{(n-1)}$ to $A_0$. An examination of the connections of the gates shows that the marker signal then follows the paths indicated by thickened continuous lines, produces an output pulse at $E_2$ representing $2^2$, which is the desired quotient, and produces an output pulse on the lead $R_3$, indicating a remainder of three. The remainedrs can be converted to binary code by a code converter like H.

Again, consider a dividened of 59, which in binary code differs from 43 only in having "1" in the second place. The marker signal pulse then follows the paths indicated by thickened broken lines. Output pulses representing the quotient are now applied from $E_2$ and $E_0$, which indicate that the quotient is $2^2+2^0=5$. A pulse representing the remainder appears in the lead $R_9$, as required.

Obvious modifications of the connection of FIGURE 2 will produce an arrangement dividing by five or even multiples of 5.

In the parallel mode form of the invention the pulses which represent the dividend must exceed in duration the total time delay of the marker pulse on passing through the various gates.

What I claim is:

1. A circuit arrangement for dividing a dividend coded in a radix A by a divisor R comprises means for receiving signal elements representing digits of the dividend in order digit by digit, a source of a signal marker signal for each division, a series of $A \times R$ paths connected from said source arranged in A groups each of R paths and gating means responsive to each of the signal elements for selecting which of A paths a marker signal may take successively at points on said paths, means for sensing which of the groups contain paths taken by the marker signal after passage through a gating means and means responsive to said sensing means for generating output signals representing digits of a quotient coded in the radix A, the group containing the path determining the respective quotient digit and means responsive to the path to which the marker signal is ultimately directed for determining the remainder.

2. An arrangement according to claim 1 adapted for division of a binary coded dividend by a divisor of value R or the product of R and a power of two, where R is an odd number greater than unity, wherein said series of paths comprises 2R paths and said gating means are such that when switching of the marker signal occurs from one path to another the order in the series of the path to which switching occurs is twice that of the path from which switching occurs, unless twice the order of the latter path is greater than 2R, in which case switching is effected to the path of which the order plus 2R is twice the order of the path from which switching occurs, and an output signal element is produced representing one digit of the quotient.

3. An arrangement according to claim 2 wherein the signal elements representing digits of the dividend are applied to said gates in time serial order and delay elements are provided in the paths to cause successive arrivals of the marker signal at the gates to coincide with successive signal elements.

4. An arrangement according to claim 2 wherein the gates are arranged in groups corresponding to different digital orders of the dividend and the respective signal elements are applied simultaneously to the groups of gates.

5. A circuit arrangement for dividing a dividend coded in a radix A by a divisor R comprising a number R of gating means, each having an input circuit, a control circuit and A output circuits, said output circuits being arranged in A groups each of R consecutive circuits, the A output circuits of each gating means corresponding to the A different digit values possible for each denominational order of the dividend, means for applying signals representing digits of said dividend in serial form to said control circuits to enable the passage of signals through said gating means to the output circuits corresponding to the instantaneous digit value, interconnections, including delay means, to each input circuit from a corresponding output circuit in every group, a source of marker signals connected to apply marker signals to one of said input circuits in synchronism with the application of the highest order digit of the dividend to said control circuits, and means for deriving the signals from the output circuits of said groups to provide signals representing a quotient in serial form, coded in the radix A.

6. A circuit arrangement for dividing a dividend coded in a radix A by a divisor R comprising means for generating signals representing the digits of the dividend, a distributing circuit for each denominational order of the dividend responsive to the individual digit values of the dividend, the distributing circuit responsive to the highest order dgit of the dividend comprising a single gating means having A output circuits, the distributor responsive to the second highest order digit comprising A gating means each having A output circuits, the distributor responsive to the third highest order digit comprising $A^2$ gating means each having A output circuits, and so on until the number of gating means required according to this geometric progression exceeds R when only R gating means are provided, the distributors responsive to the remaining digits comprising R gating means each having A output circuits, each gating means having an input circuit and a control circuit responsive to signals representing the digit value of the respective denominational order of the dividend to enable the passage of signals from said input circuit to an output circuit corresponding to the digit value, the output circuits of said distributing circuits being arranged in consecutive groups of R circuits as far as possible, the circuit arrangement further comprising interconnections between the output circuits of each distributing circuit but that responsive to the lowest order digit of the dividend and the input circuits of the distributing circuit responsive to the next lower order digit of the dividend, and where the distributing circuit has more than R output circuits and is divided into groups of R circuits each input of the succeeding distributing circuit is interconnected to an output circuit in every group as far as possible, a source of marker signals connected to apply marker signals to the input of the distributing circuit responsive to the highest order digit of the dividend in synchronism with the application of the dividend digit signals to the control circuits, so that the marker signal is directed to take a route through the distributing circuits in accordance with the dividend, means responsive to the groups containing the output circuits through which the marker signals are directed to produce output signals representing digits of a quotient in the radix A, and means responsive to the output circuit of the distributing circuit responsive to the lowest order digit of the dividend to produce a signal representing the remainder.

References Cited in the file of this patent

UNITED STATES PATENTS

| | | |
|---|---|---|
| 2,444,042 | Hartley et al. | June 29, 1948 |
| 3,082,950 | Hogan | Mar. 26, 1963 |